Patented Sept. 12, 1944

2,357,798

UNITED STATES PATENT OFFICE 2,357,798

PHENOL-FORMALDEHYDE ADHESIVES

Wendell S. Niederhauser, Moorestown, N. J., and Matthew W. Miller, Philadelphia, Pa., assignors to The Resinous Products & Chemical Company, Philadelphia, Pa., a corporation of Delaware No Drawing. Application August 14, 1941, Serial No. 406,808

5 Claims. (Cl. 260—49)

This invention relates to phenol-formaldehyde condensates which contain one methyl sulfonate group for three to to eight phenyl nuclei, which are soluble in water and hydroxylated organic solvents, which provide aqueous solutions that are relatively stable within the pH range of 1 to 10.5, and which are converted to insoluble resins when heated. The invention also concerns the process by which said resins are obtained. The condensates of this invention are particularly suitable for use as adhesives resistant to boiling water, for binding wood veneer, paper, cork, abrasives, etc.

Water-soluble phenol-formaldehyde condensates in the so-called B stage which have heretofore been available have been stable in aqueous solutions only under definitely alkaline conditions. In the presence of the required alkali, the curing of such phenol-formaldehyde condensates has required relatively high temperatures. This is a definite disadvantage in the fields in which water-soluble phenol-formaldehyde condensates may be used, such as the use of these condensates as adhesives or binders for paper, plywood, or other materials. In bonding materials containing moisture, there are often difficulties arising from use of elevated temperatures in curing in that steam pockets may be formed within the article being bonded, with consequent disruption.

The objects of this invention are to provide a water-soluble condensate from phenol and formaldehyde which is suitable for use as an adhesive, to provide a phenol-formaldehyde type condensate which yields stable aqueous solutions within a range of pH between 1 and 10.5, and to provide such a condensate which may be cured in the presence of an acid catalyst at low temperatures to form a water-proof, insoluble resin.

By "water-proof" it is understood that the glue bond will not be destroyed by water at temperatures up to and including the boiling point when tested in a standard test strip of 3-ply $\frac{1}{16}$" plywood as detailed in U. S. Navy Specifications 39 P 13 b.

It is now found that a water-soluble condensate meeting all of the above requirements is prepared by condensing phenol or metacresol and formaldehyde under alkaline conditions to form a water-soluble methylol phenol, and reacting said methylol phenol with a sulfite to form one ω-sulfonic group, or methyl sulfonate group, for three to eight phenyl nuclei. These steps of condensing and reacting may be carried out consecutively or simultaneously. These steps are preferably carried out with the reactants in aqueous solution. After the initial condensation, the products are brought to an advanced resinous state without separation of insoluble resinous materials by heating an aqueous solution of the sulfonated condensate until the viscosity of a solution having a 50% solids content is at least G on the Gardner-Holdt scale and the solution becomes dilutible with water in all proportions. The solution may be left in an alkaline state, but it is preferred that prior to use it be rendered acid. If desired, the resinous condensate may be converted to a solid by spray or drum drying. The dry product may be stored for long periods of time and may be mixed with a powdered acid so that acidic solutions ready for use as adhesives may be prepared directly from the dry mixture.

In acidifying either the powder or solution, any dilute mineral acid or an organic acid may be used to lower the pH. Strong, concentrated acids are apt to cause gelation or precipitation and are preferably avoided. Suitable acids include phosphoric, succinic, maleic, oxalic, acetic, etc. Maleic acid may be introduced by way of its anhydride, which is particularly suitable for mixing with the dried condensate. It is often advantageous to use an ammonium salt in conjunction with one of the acids, as, for example, ammonium oxalate in conjunction with oxalic acid. The strength and amount of acid added to the solution of condensate determine its useful "life," but no difficulty is encountered in preparing acidic solutions of condensates which are stable over the working periods required for preparing and applying them as adhesives, which are rapidly cured at moderate and favorable temperatures to give strong water-resistant bonds.

As an alkaline catalyst in promoting the initial reaction of formaldehyde and phenol, there may be used any basic substance such as sodium or potassium hydroxide, a quaternary ammonium hydroxide—examples of which are benzyl trimethyl ammonium hydroxide, dibenzyl dimethyl ammonium hydroxide, and the like—sodium carbonate, lime, sodium sulfite, etc.

The soluble inorganic sulfites are particularly desirable as they help to supply a needed component without necessitating the addition of excess inorganic materials. It is generally desirable to use the minimum amount of any given alkaline catalyst which will promote the initial condensation. A pH between 8 and 11 is preferred in the initial stages.

Formaldehyde is most conveniently used in the form of the usual commercial aqueous solution. It may also be used in the form of a polymer and in part may be supplied by other methylenic compounds. Similarly, the formaldehyde may in part be replaced or supplemented by other aldehydes, such as acetaldehyde, furfural, allyl aldehyde, crotonaldehyde, or benzaldehyde. For the desired reaction of aldehyde and phenol, there are required at least 1.1 mols of aldehyde to 1 mol of phenol. With larger ratios of aldehyde to phenol, however, than 1.5 to 1, the excess aldehyde is not utilized in the final product, although a ratio as high as 1.7 may be used.

While phenol itself is of primary importance, since it gives condensates which have a considerable degree of solubility in water, there may be used in place of phenol substituted phenols, such as metacresol, which likewise give water-soluble methylol phenols. Also, other substituted phenols which have ortho and/or para positions available for substitution and are capable of acquiring methylol groups by reaction with formaldehyde (so-called "methylol-forming phenols") may be used in conjunction with phenol, metacresol, or the like. The use of mixtures of phenol and a substituted phenol provides adhesives with special properties. As typical of such substituted phenols, there may be mentioned the dihydroxydiphenyl sulfones, the alkyl phenols, such as tert-butyl phenol, acyl phenols, alkoxy phenols, the polyhydroxypolyphenyl alkanes or cycloalkanes, such as dihydroxyphenyl dimethyl methane, dihydroxydiphenyl, catechol, resorcinol, phloroglucinol, etc. The amount of such phenol which may be added to phenol itself or other phenols giving a water-soluble methylol phenol is determined by the solubility in water of the resulting co-condensate. In all cases, it is desirable to maintain solubility in aqueous solutions without the addition of any considerable amount of an organic solvent and blending agent, such as methanol or ethanol, which may be used if required.

When the phenol and formaldehyde have been reacted in the presence of an alkaline catalyst to form a primary addition product, this primary product, or methylol phenol, is reacted with an inorganic sulfite to form methyl sulfonate groups within the defined ratios. The term "sulfite" is here used to include both normal sulfites, such as sodium or potassium sulfite, and acid sulfites, such as $NaHSO_3$, $NH_4HSO_3$, etc. The acid sulfites are to be preferred since they introduce a smaller amount of inorganic material and produce a condensate which may be carried to an acid pH with the minimum addition of an acidifying agent.

In effecting the initial condensation in the presence of an alkaline catalyst, temperatures up to 100° C. may be used. As the reaction is exothermic, it is desirable to control the reaction by regulation of temperature and/or rate of addition of the reactants. In general, reaction temperatures between about 55° C. and 80° C. give a sufficiently rapid rate of reaction, with excellent control thereof, so that insoluble products do not form. After the initial condensation, it is still desirable to control the reaction which ensues when a sulfite is added, as, again, the reaction is exothermic. In a preferred procedure, the reaction mixture from the primary condensation is brought to about 65°–70° C. and the required amount of sulfite added. The temperature is then maintained below 100° C. (about 80° C. being preferred) until an advanced degree of condensation and polymerization has been reached. The most satisfactory adhesives are obtained when the viscosity of the solution (adjusted to 50% solids) reaches G or higher on the Gardner-Holdt scale.

These condensates are soluble not only in water but also in such hydroxylated solvents as the monohydric alcohols, including methanol, ethanol, isopropanol, etc., in glycols and glycol ethers, including ethylene glycol, diethylene glycol, triethylene glycol, etc., and other polyhydric alcohols, including glycerine, or in mixtures of alcohols, of mixtures of alcohols and water. When non-volatile alcohols are used, and the condensates cured, a softening or plasticizing action is obtained. This is particularly valuable in rendering the bond more flexible, as in binding cork, in making laminations with fabric, or in impregnating cloth, wood, or paper.

Although the condensates may be cured in an alkaline condition, it is preferred that they be cured in an acid condition, since lower curing temperatures may then be used. The range of curing temperatures is exceptionally wide, however, so that the condensate of this invention may be used in conjunction with other resinous compositions which cure at 110° C. or higher. By proper adjustment of catalyst, curing may be effected even at room temperatures.

Further details of the preparation of the partially ω-sulfonated phenol-formaldehyde condensates useful as adhesives are shown in the following examples.

*Example 1*

A mixture of 100 parts by weight of phenol, 86.5 parts of 37% aqueous formaldehyde, and 134 parts of sodium sulfite was prepared and slowly heated to 50°–55° C. There then occurred an exothermic reaction after which the reaction mixture was maintained at 50°–55° C. for two hours and then at 80°–85° C. for two hours. The temperature was then dropped to 50° C. and 300 parts of phenol slowly added, followed by 397 parts of 37% aqueous formaldehyde. The temperature rose to 70° C. and was maintained at this point until the viscosity of the solution reached H on the Gardner-Holdt viscosity scale. The reaction mixture was then cooled to room temperature and brought to a pH just above 7 by addition of 18% hydrochloric acid. There was then added 244 parts of water and the reaction mixture heated at 80°–90° C. until a viscosity between S and W was reached. The temperature was then dropped to 75°–80° C. and held at this point until a Gardner-Holdt viscosity between Z and $Z_3$ was obtained. The resulting solution remained stable over a considerable period of time. It was acidified with a little lactic acid and applied as a glue between layers of cardboard, which were pressed at 115° C. to form a stiff board.

*Example 2*

To a cool solution of 10.6 parts of sodium hydroxide in 21.3 parts of water there were added 100 parts of phenol and 121 parts of 37% aqueous formaldehyde solution. The mixture was warmed to about 50° C. when an exothermic reaction ensued. The reacting solution was held at 55° C. by external cooling and, after the initial reaction had subsided, at 50°–55° C. for five hours. The solution was then cooled and brought to a pH between 7.5 and 8 with dilute hydrochloric acid. 27.4 parts of sodium bisulfite was then added and the solution slowly heated to 80°–90° C. and maintained at this range until the viscosity of the solution was Z to $Z_3$ (Gardner-Holdt).

The solution as prepared was stable. After acidification with phosphoric acid, the solution was spread on veneers which were pressed together and heated at 110° C. to give a waterproof bond.

*Example 3*

There were mixed 100 parts of phenol, 17.7 parts of sodium bisulfite, 5.37 parts of sodium sulfite, and 126 parts of 37% aqueous formaldehyde. The mixture was heated until an exothermic reaction set in and then cooled externally to control the reaction. The reaction mixture was then heated at 90°–95° C. until the viscosity was V to W. At this point, 53.1 parts of water was added and heating continued, to bring the viscosity to Z—$Z_3$. This product was likewise useful as an adhesive.

*Example 4*

A mixture of 100 parts of phenol, 5.37 parts of sodium sulfite, and 126 parts of 37% aqueous formaldehyde was heated until an exothermic reaction ensued, thereupon maintained below 85° C. by external cooling until the reaction subsided, and heated at about 80° C. for three hours. At this point, 17.7 parts of sodium bisulfite was added and the reaction therewith controlled by cooling. The mixture was then heated to 90° C. and carried to a viscosity of G—L. 53.1 parts of water was then added and condensation continued to a viscosity between Z and $Z_3$. The solution was spray-dried to a powder, which was kept some months without changing. Mixed with powdered oxalic acid, it was dissolved in water to form an acid-stable adhesive which was readily cured to an insoluble state at 110° C. to 120° C.

*Example 5*

A mixture of 100 parts of phenol, 178 parts of sodium sulfite, and 115 parts of 37% aqueous formaldehyde was heated at about 100°–105° C. for two and a half hours. 66.5 parts of phenol was then added and the heating continued for another three hours. The reaction mixture was cooled and 454 parts of phenol and 575 parts of 37% aqueous formaldehyde added. The reaction mixture was then maintained at 70°–75° C. until a viscosity between T and W was reached. The solution was then cooled, brought to a pH above 7 but under 7.5 with sulfuric acid, and further condensed with heat to a viscosity between X and Z.

*Example 6*

A mixture of 100 parts of a commercial cresol (containing 40–45% of metacresol, 27% of paracresol, 25% of xylenols, and 2–3% or orthocresol), 12.85 parts of 37% aqueous formaldehyde, and 20.3 parts of sodium sulfite was heated for four hours at 95°–100° C. The reaction mixture was cooled and 92.5 parts of aqueous 37% formaldehyde added. The solution was then held at 70°–75° C. until a viscosity between Z and $Z_3$ was obtained. This solution may be acidified, applied as an adhesive, and hardened with heat to give strong, water-proof bonds.

*Example 7*

A mixture of 12.8 parts of dihydroxyphenyl dimethyl methane, 1.49 parts of sodium hydroxide, and 131 parts of 37% aqueous formaldehyde solution was heated at 60° C. for one hour. There was then added 100 parts of phenol and the temperature raised to 80° C. for three hours. 23.4 parts of sodium bisulfite was added and heating continued until a viscosity of U on the Gardner-Holdt scale was reached. The resin solution was diluted with 56 parts of water and heating continued at 80° C. until a viscosity of Z was reached. This product was acidified with a little dilute hydrochloric acid and applied to veneers which were pressed together and heated at 120° C. to give a strong, water-proof bond.

*Example 8*

A mixture of 100 parts of phenol, 3.18 parts of sodium sulfite, and 120 parts of 37% aqueous formaldehyde was heated until an exothermic reaction began and then held at 80° C. for three hours. The reaction mixture was cooled to 70° C., 13.1 parts of sodium bisulfite added, and the temperature held at 80° C. until a viscosity of W was reached. At this point, 56 parts of water was added and the solution held at 75° C. until a viscosity of Z was obtained. It will be noted that in this preparation the ratio of phenol to formaldehyde available for resin formation is 1 to 1.26 and the ratio of sulfite to phenol is 0.14 to 1. The product is dilutible with water or hydroxylated solvents. It is stable when mixed with dilute acids. It may be dried at a moderate or low temperature to give a solid which remains soluble and reactive.

*Example 9*

A mixture of 100 parts of phenol, 16.75 parts of sodium sulfite, 27.6 parts of sodium bisulfite, and 73.5 parts of water was warmed to 55° C. and thereto was slowly added 128 parts of 37% aqueous formaldehyde. The reaction mixture was maintained at 90°–95° C. until a viscosity of O was reached, whereupon the temperature was kept at about 80° C. until the viscosity became $Z_4$. In this preparation, the ratio of phenol to formaldehyde available for resin formation was 1 to 1.1 and the sulfite to phenol ratio was 0.37 to 1. The solution was stable to acid. When applied as an adhesive, it was cured at relatively low temperature to give a strong, water-proof bond.

*Example 10*

A mixture of 100 parts of phenol, 152 parts of 37% aqueous formaldehyde, and 4.45 parts of sodium sulfite was heated at 80°–90° C. for two and a half hours. 18.5 parts of sodium bisulfite was then added and the condensation continued at 80° to 90° C. until a viscosity of Z in the Gardner-Holdt scale was reached. At this point, 49 parts of water was added and the reaction again carried on until the viscosity reached $Z_3$. In this preparation, the total ratio of formaldehyde to phenol was 1.7 to 1, but the ratio in the final product was 1.5 to 1. The ratio of sulfite to phenol was 0.2 to 1.

We claim:

1. A process for preparing a water-soluble resinous composition which is stable in cold aqueous solutions having a pH above 1.5 and under 10.5, which comprises condensing only three components, namely, (a) a phenol from the group consisting of phenol and metacresol, (b) formaldehyde, and (c) a water-soluble inorganic sulfite, said phenol and said formaldehyde being condensed below 100° C., in the ratio of one mol of said phenol to 1.1 to 1.5 mols of said formaldehyde and in the presence of an alkaline catalyst, to form a water-soluble methylol phenol, said methylol phenol then being reacted with said water-soluble inorganic sulfite in the ratio of one mol of said sulfite to 3 to 8 mols of said methylol phenol, thereby to form sulfonate groups in the resulting condensate, and thereafter heating the sulfonated condensate of said three components in aqueous solution until the viscosity of a 50% aqueous solution thereof becomes at least G on the Gardner-Holdt scale.

2. As a new product, a water-soluble, partially polymerized, thermosetting phenol-formaldehyde composition which contains methylene sulfonate groups, which dissolves in water to give solutions which may be acidified without precipitation of insoluble resin, and which is the resinous product obtained by condensing only three components, namely (a) a phenol from the group consisting of phenol and metacresol, (b) formaldehyde, and (c) a water-soluble inorganic sulfite, said phenol and said formaldehyde being condensed below 100° C., in the ratio of one mol of said phenol to 1.1 to 1.5 mols of said formaldehyde and in the presence of an alkaline catalyst, to form a water-soluble methylol phenol, said methylol phenol then being reacted with said water-soluble inorganic sulfite in the ratio of one mol of said sulfite to 3 to 8 mols of said methylol phenol, thereby to form methylene sulfonate groups in the resulting condensate, and thereafter heating the sulfonated condensate of said three components in aqueous solution until the viscosity of a 50% aqueous solution thereof becomes at least G on the Gardner-Holdt scale.

3. As a new composition of matter, suitable as a waterproof adhesive when dissolved in water, a water-soluble dry powder comprising a mixture of a solid acid and a dry, water-soluble, partially polymerized, phenol-formaldehyde condensate containing methylene sulfonate groups, said condensate being the product obtained by condensing only three components, namely, (a) a phenol from the group consisting of phenol and metacresol, (b) formaldehyde, and (c) a water-soluble inorganic sulfite, said phenol and said formaldehyde being condensed below 100° C., in the ratio of one mol of said phenol to 1.1 to 1.5 mols of said formaldehyde and in the presence of an alkaline catalyst, to form a water-soluble methylol phenol, said methylol phenol then being reacted with said water-soluble inorganic sulfite in the ratio of one mol of said sulfite to 3 to 8 mols of said methylol phenol, thereby to form methylene sulfonate groups in the resulting condensate, heating the sulfonated condensate of said three components in aqueous solution until the viscosity of a 50% aqueous solution of said sulfonated condensate becomes at least G on the Gardner-Holdt scale, and thereafter drying said condensate.

4. A plywood adhesive giving waterproof bonds comprising an aqueous solution of a water-soluble, partially polymerized, phenol-formaldehyde condensate which may be dissolved in water and acidified without substantial precipitation of insoluble resin and which is the product obtained by condensing only three components, namely, (a) a phenol from the group consisting of phenol and metacresol, (b) formaldehyde, and (c) a water-soluble inorganic sulfite, said phenol and said formaldehyde being condensed below 100° C., in the ratio of one mol of said phenol to 1.1 to 1.5 mols of said formaldehyde and in the presence of an alkaline catalyst, to form a water-soluble methylol phenol, said methylol phenol then being reacted with said water-soluble inorganic sulfite in the ratio of one mol of said sulfite to 3 to 8 mols of said methylol phenol, thereby to form sulfonate groups in the resulting condensate, and heating the sulfonated condensate of said three components in aqueous solution until the viscosity of a 50% aqueous solution of said sulfonated condensate becomes at least G on the Gardner-Holdt scale.

5. A plywood adhesive giving waterproof bonds comprising an acidified aqueous solution of pH above 1.0 of a water-soluble, partially polymerized, phenol-formaldehyde condensate which may be dissolved in water and acidified without substantial precipitation of insoluble resin and which is the product obtained by condensing only three components, namely, (a) a phenol from the group consisting of phenol and metacresol, (b) formaldehyde, and (c) a water-soluble inorganic sulfite, said phenol and said formaldehyde being condensed below 100° C., in the ratio of one mol of said phenol to 1.1 to 1.5 mols of said formaldehyde and in the presence of an alkaline catalyst, to form a water-soluble methylol phenol, said methylol phenol then being reacted with said water-soluble inorganic sulfite in the ratio of one mol of said sulfite to 3 to 8 mols of said methylol phenol, thereby to form sulfonate groups in the resulting condensate, and thereafter heating the sulfonated condensate of said three components in aqueous solution until the viscosity of a 50% aqueous solution thereof becomes at least G on the Gardner-Holdt scale.

WENDELL S. NIEDERHAUSER.
MATTHEW W. MILLER.